(12) United States Patent
Brown et al.

(10) Patent No.: US 12,443,961 B2
(45) Date of Patent: Oct. 14, 2025

(54) FRAUD PREVENTION SYSTEMS AND METHODS FOR SELECTIVELY GENERATING VIRTUAL ACCOUNT NUMBERS

(71) Applicant: Capital One Services, LLC, McLean, VA (US)

(72) Inventors: Kelly Jo Earl Brown, Rockville, MD (US); Noble Ozoka, Richmond, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

(21) Appl. No.: 18/317,027

(22) Filed: May 12, 2023

(65) Prior Publication Data

US 2023/0281631 A1    Sep. 7, 2023

Related U.S. Application Data

(63) Continuation of application No. 17/171,034, filed on Feb. 9, 2021, now Pat. No. 11,687,939.

(51) Int. Cl.
G06Q 20/40    (2012.01)

(52) U.S. Cl.
CPC ..... *G06Q 20/4016* (2013.01); *G06Q 20/4014* (2013.01); *G06Q 20/4015* (2020.05)

(58) Field of Classification Search
None
See application file for complete search history.

(56) References Cited

U.S. PATENT DOCUMENTS

| 6,000,832 A | 12/1999 | Franklin et al. |
| 6,163,771 A | 12/2000 | Walker et al. |

(Continued)

FOREIGN PATENT DOCUMENTS

| KR | 102046134 | * 11/2019 | ............ G06N 3/08 |

OTHER PUBLICATIONS

International Search Report and Written Opinion in related PCT Application No. PCT/US22/15088, mailed May 3, 2022 (18 pages).

(Continued)

*Primary Examiner* — Peter D Nolan
*Assistant Examiner* — Matthew Cobb
(74) *Attorney, Agent, or Firm* — TROUTMAN PEPPER LOCKE LLP; Christopher J. Forstner; John A. Morrissett (57) ABSTRACT

Disclosed embodiments may include a method that includes receiving first identifying information associated with a first user from a computing device; determining a score based on the first identifying information; determining whether the score is less than a threshold; pseudo-randomly generate and transmit a one-time use number to the computing device when the score is less than the threshold. When the score is greater than or equal to the threshold, the method may include transmitting, to the computing device, second instructions prompting the first user to provide second identifying information. Responsive to receiving the second identifying information of the first user, the method may include determining that the second identifying information matches stored second identifying information. Responsive to the second identifying information matching stored second identifying information, the method may include pseudo-randomly generate and transmit the one-time use number to the computing device.

20 Claims, 5 Drawing Sheets

(56) References Cited

U.S. PATENT DOCUMENTS

| | | | |
|---|---|---|---|
| 7,567,934 B2 | 7/2009 | Flitcroft et al. | |
| 9,154,514 B1* | 10/2015 | Prakash | G06Q 10/107 |
| 10,949,859 B2* | 3/2021 | Todasco | H04L 63/126 |
| 11,144,923 B1* | 10/2021 | Griffith | G06Q 20/123 |
| 2010/0043055 A1 | 2/2010 | Baumgart | |
| 2011/0143711 A1* | 6/2011 | Hirson | H04L 63/18 |
| | | | 455/410 |
| 2015/0326712 A1* | 11/2015 | Montpetit | G06F 16/2455 |
| | | | 379/142.06 |
| 2016/0027000 A1 | 1/2016 | Kurian | |
| 2017/0004136 A1 | 1/2017 | Cassel et al. | |
| 2017/0063840 A1 | 3/2017 | Krishnaiah | |
| 2018/0025045 A1 | 1/2018 | Kirti | |
| 2019/0222567 A1 | 7/2019 | Caldera et al. | |
| 2020/0042773 A1 | 2/2020 | Benkreira et al. | |
| 2020/0151434 A1* | 5/2020 | Lai | G06V 10/751 |
| 2020/0193443 A1* | 6/2020 | Piel | G06N 20/00 |
| 2020/0202317 A1 | 6/2020 | Cassel et al. | |
| 2020/0327538 A1 | 10/2020 | Shrivastava | |

OTHER PUBLICATIONS

International Preliminary Report on Patentability in related PCT Application No. PCT/US2022/015088, mailed Aug. 24, 2023.

* cited by examiner

FRAUD PREVENTION SYSTEMS AND METHODS FOR SELECTIVELY GENERATING VIRTUAL ACCOUNT NUMBERS

CROSS-REFERENCE TO RELATED APPLICATIONS

This application is a continuation of, and claims priority under 35 U.S.C. § 120 to, U.S. patent application Ser. No. 17/171,034, filed Feb. 9, 2021, the entire contents of which are fully incorporated herein by reference.

FIELD

The disclosed technology relates to fraud prevention systems, particularly fraud prevention systems and methods for selectively generating a virtual account number (e.g., a one-time-use number) to better secure customer account information.

BACKGROUND

Customers and card issuers alike want to reduce the chances of fraud for purchases and transactions. Currently, customers in card-not-present transactions (e.g., "online" purchases over the Internet) provide their payment card (e.g., credit card or debit card) information (e.g., card number, cardholder name, expiration date, etc.) to merchants when making a purchase. Similarly, customers commonly provide their payment cards, which list such information, to merchants when making a card-present purchase. Though card-not-present transactions present higher risk, payment card information could be compromised via hackers or by the merchant itself in either type of transaction, which could lead to fraudulent purchases using the payment card information that the card issuer or the card holder may be liable for.

Accordingly, there is a need for improved fraud prevention systems to limit the risk of payment card information being compromised in both types of transactions, but particularly for card-not-present (e.g., online) transactions. Embodiments of the present disclosure are directed to this and other considerations.

SUMMARY

Disclosed embodiments may include a system that includes one or more processors and a memory in communication with the one or more processors and storing instructions are configured to cause the communication system to perform a method for selectively generating virtual account information (e.g., a one-time use number, which may be virtual account number associated with a user's account) for fraud prevention. For example, the system may receive first identifying information associated with a first user from a computing device and determine a score based on the first identifying information. When the systems determines that the score is less than a threshold, it may pseudo-randomly generate and transmit a one-time use number to the computing device. Conversely, when the score is greater than or equal to the threshold, the system may transmit second instructions to the computing device prompting the first user to provide second identifying information. Responsive to receiving the second identifying information of the first user, the system may then determine whether the second identifying information matches stored second identifying information. When it does, the system may pseudo-randomly generate and transmit the one-time use number to the computing device.

In another aspect, the systems in disclosed embodiments may perform another method for selectively generating a one-time use number for an outside system server. The system may receive a request from an outside system server to receive a one-time use number associated with a first user, and the request may include first user identifying information associated with the first user. Upon receiving this information, the system may determine a score based on the first user identifying information and whether the score is less than a threshold. When it is, the system may pseudo-randomly generate and transmit the one-time use number to the outside system server.

In yet another aspect, the systems in disclosed embodiments may perform yet another method for selectively generating a one-time use number for a user. The system may receive first identifying information associated with a first user from a computing device and determine. a score based on the first identifying information. Upon determining that the score is greater than or equal to a threshold, the system may also transmit second instructions to the computing device prompting the first user to provide second identifying information. Responsive to receiving the second identifying information of the first user, the system may determine that the second identifying information matches stored second identifying information and pseudo-randomly generate and transmit a one-time use number to the computing device.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
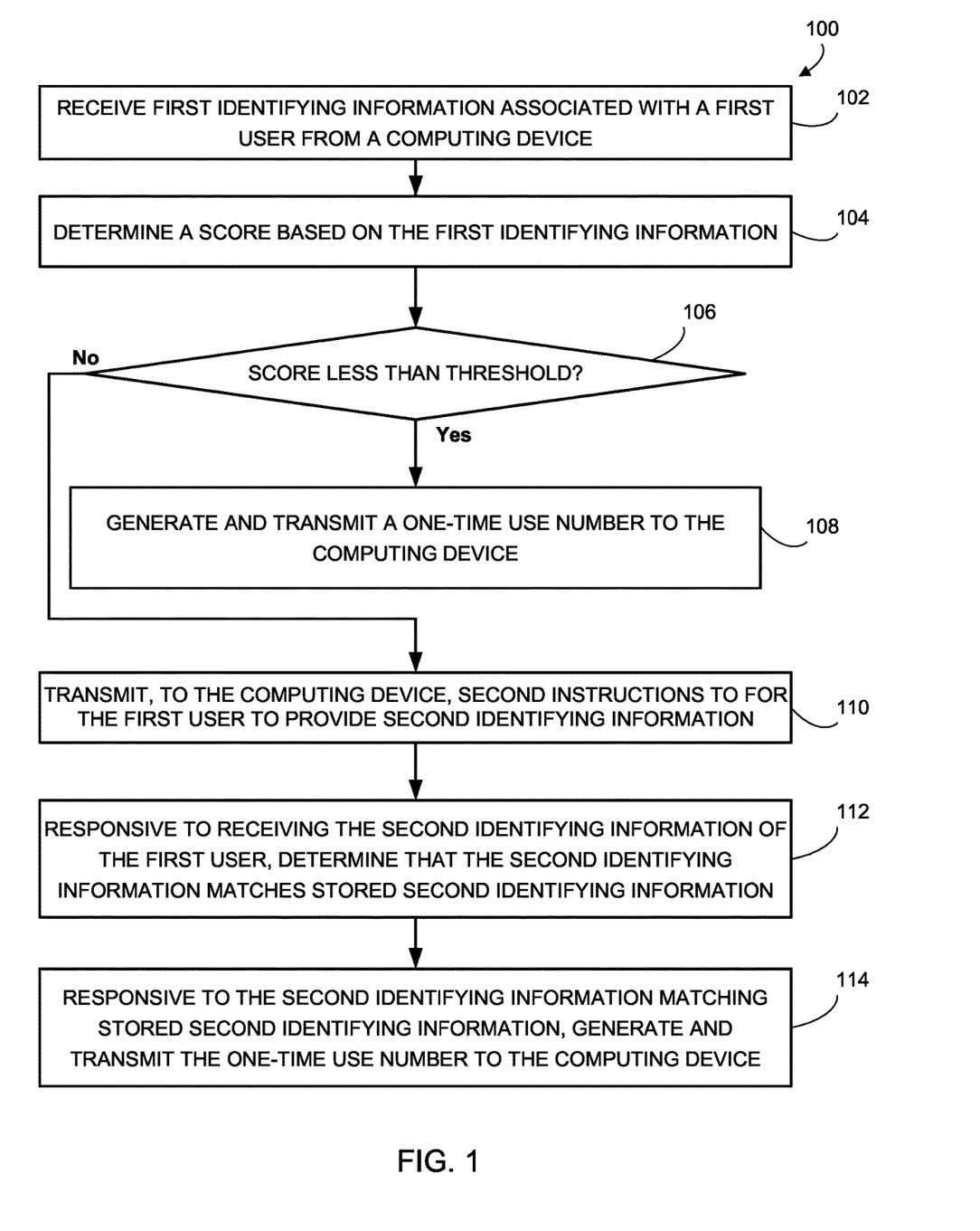
FIG. 1 is a flow diagram illustrating an exemplary method for determining when to generate a virtual account number, in accordance with certain embodiments of the disclosed technology.

FIG. 1 is a flow diagram illustrating an exemplary method 100 for determining when to generate a virtual account number, in accordance with certain embodiments of the disclosed technology. The steps of method 100 may be performed by one or more components of a risk system 508 (e.g., virtual number generating system 420 or a web server 510), as described in more detail with respect to FIGS. 4 and 5.

Figure 5:
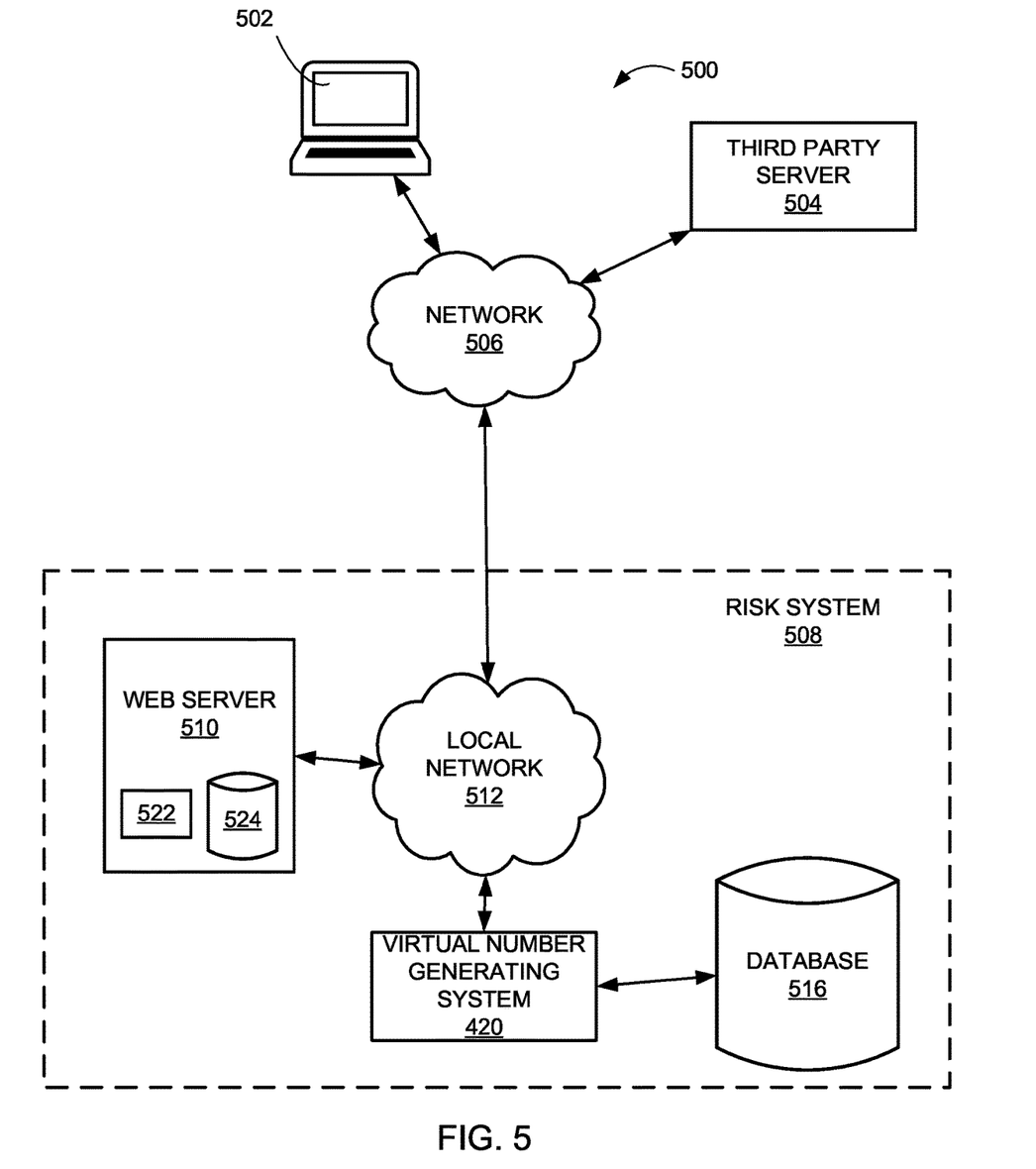
FIG. 5 is a block diagram of an example system that may be used to determine when to generate a virtual account number, according to an example implementation of the disclosed technology.

In block 102, the risk system 508 (e.g., a virtual number generating system 420) may receive first identifying information associated with a first user from a computing device (e.g., third party server 504 shown in FIG. 5). The first identifying information may include an email address and/or a phone number associated with the first user. The first identifying information may also include a first user device location (e.g., global positioning system information).

In block 104, the risk system 508 (e.g., a virtual number generating system 420) may determine a risk score based on the first identifying information, which may involve weighing any one or combination of the factors listed below.

In a first aspect, determining the risk score may include determining whether the received phone number matches a stored phone number. When it does, the system may generate, for example, a first sub-score that is equal to zero. When the phone number does not match the stored phone number, the system may generate a first sub-score that is greater than zero.

In a second aspect, determining the risk score may further include determining whether the received email associated with the first user matches a stored email associated with the first user. When it does, the system may generate a second sub-score that is equal to zero. When the email does not match the stored email, the system may generate the second sub-score that is greater than zero.

In a third aspect, determining the risk score may further include determining whether the first user device identifier associated with the first user matches a stored first user device identifier associated with the first user. The first user device identifier may be an internet protocol (IP) address, media access control (MAC) address, and international mobile equipment identity (IMEI). When it does, the system may generate a third sub-score that is equal to zero. When the first user device does not match the stored first user device, the system generate the third sub-score that is greater than zero.

In a fourth aspect, determining the risk score may further include determining the risk score by combining the first sub-score, the second sub-score, and the third sub-score. This could include aggregating the three sub-scores, averaging the three sub-scores, or aggregating the three sub-scores but applying different weights to the different sub-score to arrive at the risk-score. For example, the risk system 508 (e.g., a virtual number generating system 420) would dynamically determine to weight the of each sub-score.

In block 106, the risk system 508 (e.g., a virtual number generating system 420) may determine whether the risk score is less than a risk threshold. When the risk system 508 determines that the risk score is less than the risk threshold, the method 100 may proceed to block 108. When the risk system 508 determines that the risk score is greater than or equal to the risk threshold, the method 100 may proceed to block 110. The risk system 508 (e.g., a virtual number generating system 420) sets a risk threshold based on an analysis of preventing fraud and a number of customers prevented from conducting transactions. In some embodiments, the risk system 508 (e.g., a virtual number generating system 420) may use one or more machine learning models to set the risk threshold based on previous risk assessments for prior transactions.

In block 108, the risk system 508 (e.g., a virtual number generating system 420) may generate and transmit a virtual number (e.g., a temporary or one-time use number) to the computing device (e.g., the third party server 504). The virtual number may correspond with or be linked to a user or customer's credit card account or debit card account so that the user may make online or in person payments. The virtual number may be a temporary number such as a one-time use number that can only be used for a single transaction. The virtual number may be pseudo-random. That is the number may be generated so that some digits that corresponds correspond with a particular card network (E.g., Visa, Mastercard) or with the issuer of a card. For example, the first digit in a credit card number denotes the card network (e.g., 4 is Visa, 5 is Mastercard). After that, the next five digits identify the card issuer (e.g., 14709 is Capital One). The next ten or so digits identify the individual account of a user. In a sixteen-digit credit card number, these ten digits may be randomly generated while the first six digits may be assigned based on the affiliated card network and the card issuer. In other embodiments, the virtual number may be completely random.

The virtual number is tied to the user's credit card. A new expiration date and card verification value (CVV) is also generated with the virtual number. The expiration date may any date in the future. For example, the expiration date may be set to be three years ahead of the current date. The CVV may be randomly generated.

In block 110, the risk system 508 (e.g., a virtual number generating system 420) may transmit, to the computing device (e.g., the third party server 504), second instructions (or a second message with second instructions) for the first user to provide second identifying information. The second identifying information may be any information that identifies the user. For example, the second identifying information may be one or a combination of the following information: a social security number, a date of birth, a selfie photograph, home address, email address, phone number, account number, mother's maiden name, etc.

In block 112, the risk system 508 (e.g., a virtual number generating system 420) may determine that the second identifying information matches stored second identifying information in response to receiving the second identifying information of the first user either directly for via the computing device (e.g., the third party server 504). In some embodiments, the match may not be an exact match (e.g., the match may be within a predetermined matching threshold). If the second identifying information is the selfie photograph, then the risk system 508 (e.g., a virtual number generating system 420) may use a convolutional neural network (CNN) to match the selfie photograph to a stored selfie photograph within the risk system 508. In some embodiments, a third party server (separate from third party server 504) may be used to match the photograph using machine learning algorithms of a neural network.

In block 114, the risk system 508 (e.g., a virtual number generating system 420) may generate and transmit the virtual number to the computing device (e.g., third party server 504). The virtual number may correspond with or linked to a user or customer's credit card account or debit card account so that the user may make online payment or in person payments. The virtual number may be a temporary number such as a one-time use number that can only be used for a single transaction. The virtual number may be pseudo-random. That is the number may be generated so that some digits that corresponds correspond with a particular card network (E.g., Visa, Mastercard) or with the issuer of a card. For example, the first digit in a credit card number denotes the card network (e.g., 4 is Visa, 5 is Mastercard). After that, the next five digits identify the card issuer (e.g., 14709 is Capital One). The next ten or so digits identify the individual account of a user. In a sixteen-digit credit card number, these ten digits may be randomly generated (excluding credit card numbers being actively used by customers) while the first six digits may be assigned based on the affiliated card network and the card issuer. In other embodiments, the virtual number may be completely random.

In some embodiments, the risk system 508 (e.g., a virtual number generating system 420) may never receive second identifying information (e.g., block 110). In that case, the method terminates, and no virtual number is generated. Similarly, the risk system 508 (e.g., a virtual number generating system 420) may receive second identifying information that does not match the stored second identifying information (e.g., block 112). In that case, the method terminates, and no virtual number is generated.

Figure 2:
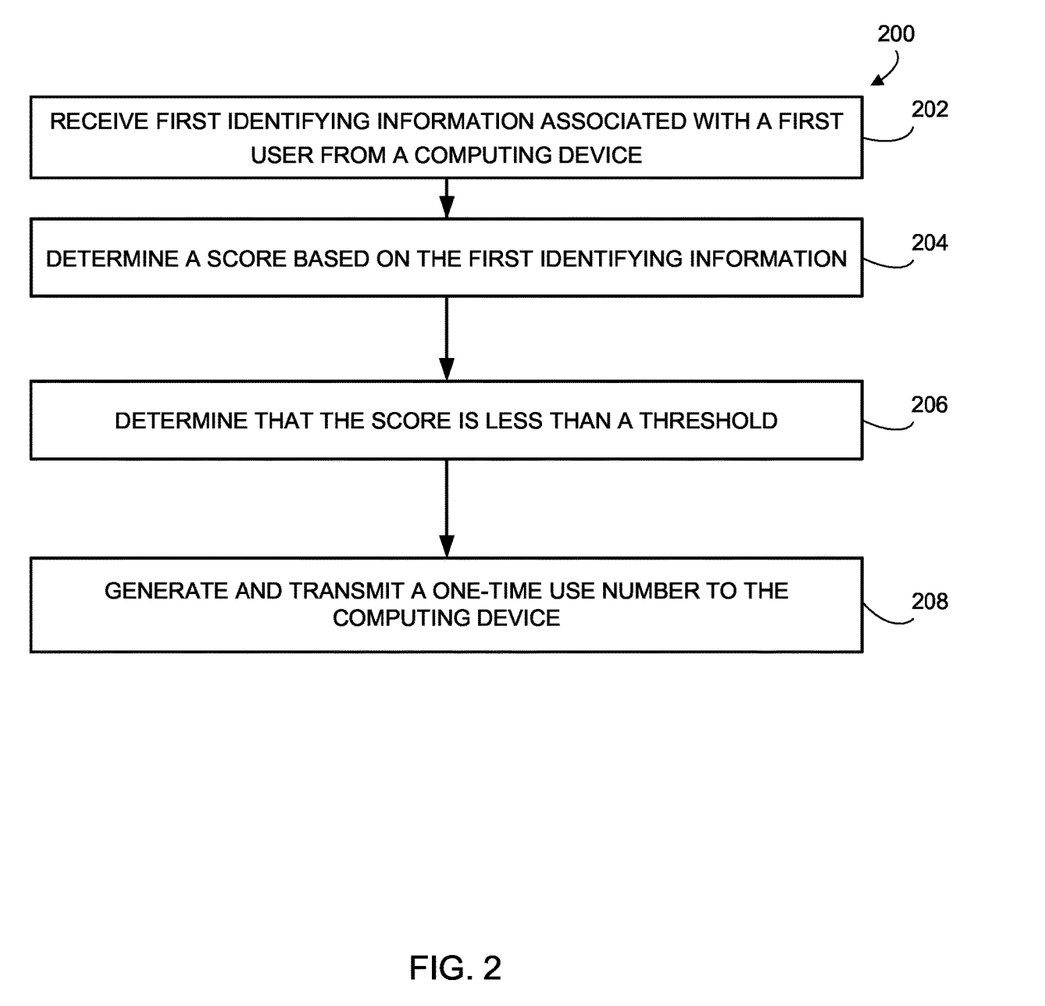
FIG. 2 is a flow diagram illustrating an exemplary method for determining when to generate a virtual account number, in accordance with certain embodiments of the disclosed technology.

FIG. 2 is a flow diagram illustrating an exemplary method 200 for determining when to generate a virtual account number, in accordance with certain embodiments of the disclosed technology. The steps of method 200 may be performed by one or more components of a risk system 508 (e.g., virtual number generating system 420 or a web server 510), as described in more detail with respect to FIGS. 4 and 5.

Method 200 of FIG. 2 is similar to method 100 of FIG. 1, except that method 200 does not include blocks similar to blocks 110, 112, and 114. The descriptions of blocks 202, 204, 206, and 208 in method 200 are the same as or similar to the respective descriptions of blocks 102, 104, 106, and 108 of method 100 and are not repeated herein for brevity.

Figure 3:
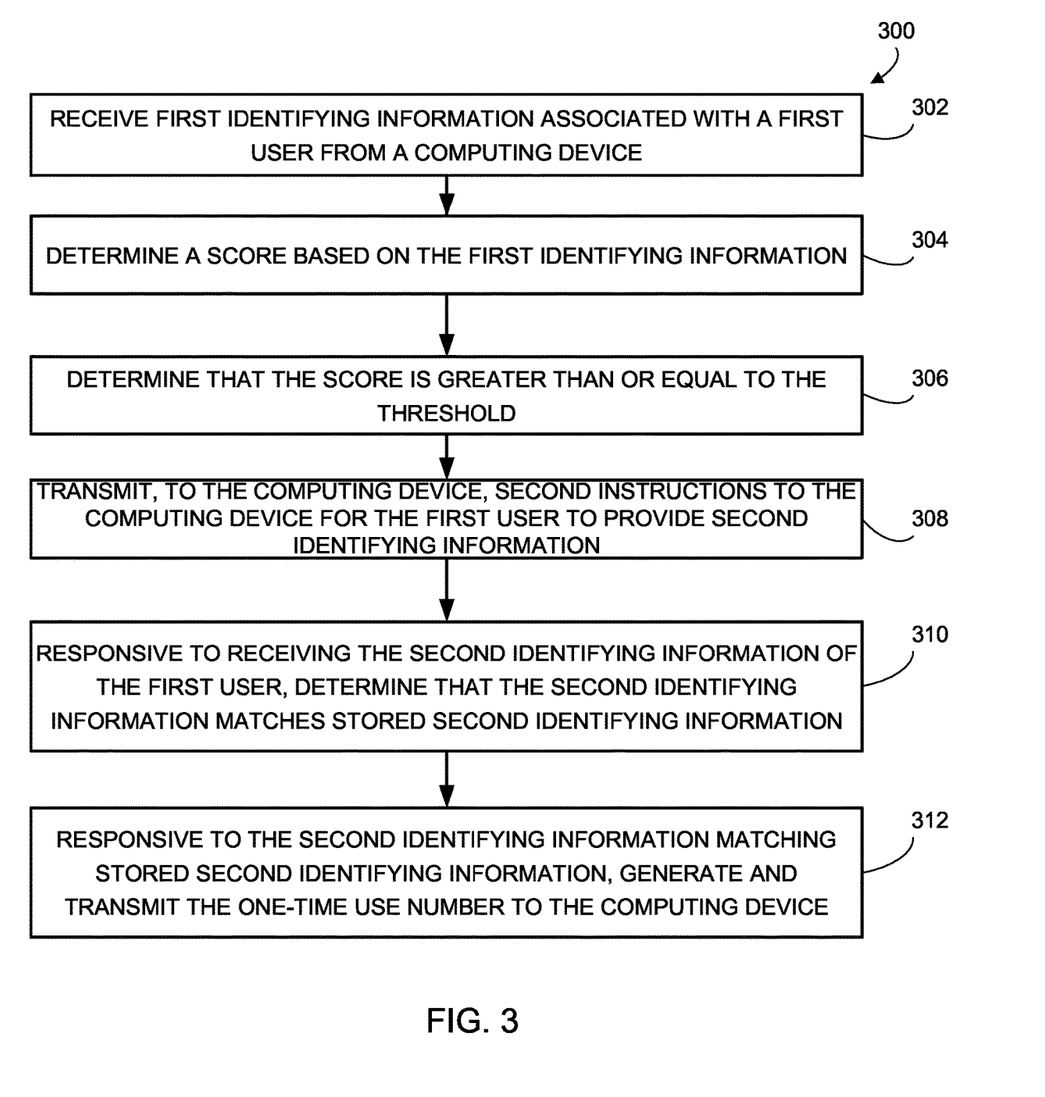
FIG. 3 is a flow diagram illustrating an exemplary method for determining when to generate a virtual account number, in accordance with certain embodiments of the disclosed technology.

FIG. 3 is a flow diagram illustrating an exemplary method 300 for determining when to generate a virtual account number, in accordance with certain embodiments of the disclosed technology. The steps of method 300 may be performed by one or more components of a risk system 508 (e.g., virtual number generating system 420 or a web server 510), as described in more detail with respect to FIGS. 4 and 5.

Method 300 of FIG. 3 is similar to method 100 of FIG. 1, except that method 300 does not include blocks similar to block 108. The descriptions of blocks 302, 304, 306, 308, 310, and 312 in method 300 are the same as or similar to the respective descriptions of blocks 102, 104, 106, 110, 112, and 114 of method 100 and are not repeated herein for brevity.

Figure 4:
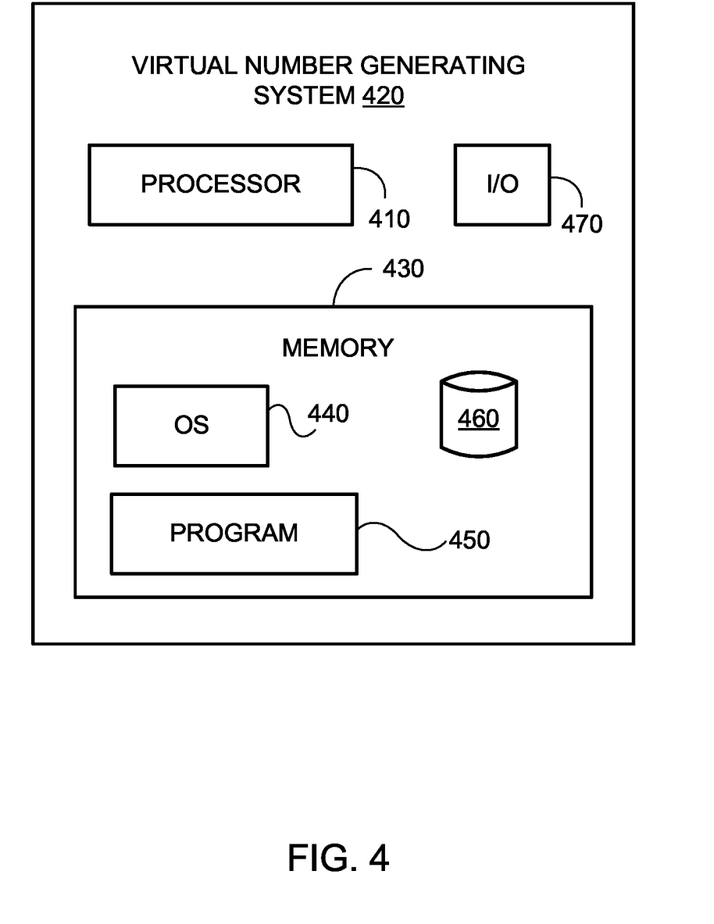
FIG. 4 is a block diagram of a virtual number generating system used to determine when to generate a virtual account number, according to an example implementation of the disclosed technology.

FIG. 4 is a block diagram of the example virtual number generating system 420, as also depicted in FIG. 5. According to some embodiments, the user device 502, the web server 510, and the third party server 504, as depicted in FIG. 5 and described below, may have a similar structure and components that are similar to those described with respect to virtual number generating system 420 shown in FIG. 4. As shown, the virtual number generating system 420 may include a processor 410, an input/output ("I/O") device 420, a memory 430 containing an operating system ("OS") 440 and a program 450. In certain example implementations, the character categorizing system 420 may be a single server or may be configured as a distributed computer system including multiple servers or computers that interoperate to perform one or more of the processes and functionalities associated with the disclosed embodiments. In some embodiments, the virtual number generating system 420 may further include a peripheral interface, a transceiver, a mobile network interface in communication with the processor 410, a bus configured to facilitate communication between the various components of the virtual number generating system 420, and a power source configured to power one or more components of the virtual number generating system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 410 may be a single core processor that is configured with virtual processing technologies. In certain embodiments, the processor 310 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the virtual number generating system 420 may include one or more storage devices configured to store information used by the processor 410 (or other components) to perform certain functions related to the disclosed embodiments. In one example, the virtual number generating system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the virtual number generating system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the virtual number generating system 420 may include the memory 430 that may include one or more programs 450 to perform one or more functions of the disclosed embodiments. For example, in some embodiments, the virtual number generating system 420 may additionally manage dialogue and/or other interactions with the customer via a program 450.

The processor 410 may execute one or more programs 450 located remotely from the system 500 (such as the system shown in FIG. 5). For example, the system 500 may access one or more remote programs 450, that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a virtual number generator database 460 for storing related data to enable the virtual number generating system 420 to perform one or more of the processes and functionalities associated with the disclosed embodiments.

The virtual number generator 460 may include stored data relating to weighting sub-score, phone numbers, emails, and user device locations associated with a plurality of users. According to some embodiments, the functions provided by the categorizing database 460 may also be provided by a database that is external to the character categorizing system 420, such as the database 516 as shown in FIG. 5.

The virtual number generating system 420 may also be communicatively connected to one or more memory devices (e.g., databases) locally or through a network. The remote memory devices may be configured to store information and may be accessed and/or managed by the virtual number generating system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The virtual number generating system 420 may also include one or more I/O devices 470 that may comprise one or more interfaces for receiving signals or input from devices and providing signals or output to one or more devices that allow data to be received and/or transmitted by the virtual number generating system 420. For example, the virtual number generating system 420 may include interface components, which may provide interfaces to one or more input devices, such as one or more keyboards, mouse devices, touch screens, track pads, trackballs, scroll wheels, digital cameras, microphones, sensors, and the like, that enable the virtual number generating system 420 to receive data from a use (such as, for example, via the user device 502).

In example embodiments of the disclosed technology, the character categorizing system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the virtual number generating system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the virtual number generating system 420 may include a greater or lesser number of components than those illustrated.

FIG. 5 is a block diagram of an example system 500 that may be used to increase categorize characters in text string with increase accuracy, according to an example implementation of the disclosed technology The components and arrangements shown in FIG. 5 are not intended to limit the disclosed embodiments as the components used to implement the disclosed processes and features may vary. As shown, system 500 may interact with a user device 502 via a network 506. In certain example implementations, the system 500 may include a web server 510 and a local network 512, character categorizing system 420, and a database 516.

In some embodiments, a customer may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 506 and ultimately communicating with one or more components of the system 500. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from an entity associated with the system 500. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

In accordance with certain example implementations, a third-party server 504 may be in communication with the system 500 via the network 506. In certain implementations, the third-party server 504 can include a computer system associated with an entity (other than the entity associated with the system 500 and its customers) that performs one or more functions associated with the customers.

The system 500 may be associated with and optionally controlled by one or more entities such as a business, corporation, individual, partnership, or any other entity that provides one or more of goods, services, and consultations to individuals such as customers. The system 500 may include one or more servers and computer systems for performing one or more functions associated with products and/or services that the organization provides. Such servers and computer systems may include, for example, the web server 510 as well as any other computer systems necessary to accomplish tasks associated with the organization or the needs of customers (which may be customers of the entity associated with the organization). The web server 510 may include a computer system configured to generate and provide one or more websites accessible to customers, as well as any other individuals involved in an organization's normal operations. The web server 510, for example, may include a computer system configured to receive communications from the user device 502 via for example, a mobile application, a chat program, an instant messaging program, a voice-to-text program, an SMS message, email, or any other type or format of written or electronic communication. The web server 510 may have one or more processors 522 and one or more web server databases 524, which may be any suitable repository of website data. Information stored in the web server 510 may be accessed (e.g., retrieved, updated, and added to) via the local network 512 (and/or the network 506) by one or more devices (e.g., the virtual number generating system 420) of the system 500.

The local network 512 may include any type of computer networking arrangement used to exchange data in a localized area, such as WiFi, Bluetooth™ Ethernet, and other suitable network connections that enable components of the system 500 to interact with one another and to connect to the network 506 for interacting with components in the system 500 environment. In some embodiments, the local network 512 may include an interface for communicating with or linking to the network 506. In other embodiments, certain components of the system 500 may communicate via the network 506, without a separate local network 516.

In accordance with certain example implementations of the disclosed technology, the risk system 508, which is described more fully below with reference to FIG. 5, may include one or more computer systems configured to compile data from a plurality of sources, such as the web server 510, the virtual number generating system 420, and/or the database 516. The virtual number generating system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, and business operations. The database 516 may also serve as a back-up storage device and may contain data and information that is also stored on, for example, databases 524 and 460, as discussed with reference to FIG. 4.

EXEMPLARY USE CASES

Sam decides that she want to purchase a blowup swimming pool on a merchant website. Sam selects the item she wants to purchase and proceeds to the check out webpage that prompts Sam to enter her credit card information. Instead, Sam relies on autofill software that runs natively on her laptop computer (e.g., user device 502), via a browser or a browser plugin. The autofill software transmits and receives data with a third party server 504 that transmits and receives data with a risk system 508 (including a virtual number generating system 420). The third party server 504 transmits a request to the risk system 508 for a virtual credit card number. The request includes a phone number, email, and device location associated with Sam. Previously, Sam registered with the autofill software this identifying information. Upon receiving Sam's phone number associated with the request for a virtual number, the risk system 508 (e.g., the virtual number generating system 420) determines a risk score based on, for example, whether the phone number, email, and device location matched stored a stored phone number, a stored email, and a stored device location for Sam. If the risk score is less than a risk threshold, then the risk system 508 (e.g., the virtual number generating system 420) generates and transmits a virtual number to the third party server 504, which in turn transmits the virtual number to Sam's laptop (e.g., user device 502) for use in purchasing the blowup swimming pool. The virtual number is a pseudo-random credit card number with the first six digits corresponding to the card network and the card issuer and the last 10 digits being generated randomly excluding active current credit card numbers from the issues.

If the risk score is greater than or equal to the risk threshold, then the risk system 508 (e.g., the virtual number generating system 420) transmit, to the third party server 504, second instructions for prompting the first user to provide second identifying information such as a social security number (or the last four digits), a date of birth, or a home address. The third party server 504 may transmit the prompt for the second identifying information to Sam's laptop (e.g., user device 502) causing the laptop to display the prompt. Sam enters the requested second identifying information via user input into an internet form provided with the prompt. Sam's laptop (e.g., user device 502 transmits the second identifying information to the third party server 504, which transmits the second identifying information to the risk system 508 (e.g., the virtual number generating system 420). Responsive to receiving the second identifying information, the risk system 508 (e.g., the virtual number generating system 420) determines that the second identifying information matches stored second identifying information which was previously provided by the user because the user has an account with the organization (e.g., credit card company) associated with the risk system 508. Responsive to the second identifying information matching stored second identifying information, pseudo-randomly generate and transmit the virtual number to the third party server 504, which in turn transmits the virtual number to Sam's laptop (e.g., user device 502) for use in purchasing the blowup swimming pool. The virtual number is pseudo-random credit card number with the first six digits corresponding to the card network and the card issuer and the last 10 digits being generated randomly excluding active current credit card numbers from the issues.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing first instructions configured to cause the system to:
   receive, via autofill software running on a computing device, first identifying information associated with a first user, the first identifying information comprising at least one or more of global positioning system information and an internet protocol address;
   determine a score based on the first identifying information;
   set, using one or more machine learning models, a first threshold based on previous risk assessments for prior transactions;
   determine whether the score is less than the first threshold;
   when the score is less than the first threshold, generate and transmit a one-time use number to the autofill software running on the computing device to automatically provide the one-time use number to a merchant website, wherein the one-time use number comprises a virtual account number that is linked to the first user's credit card account or debit account;
   when the score is greater than or equal to the first threshold:
      receive second identifying information associated with the first user, wherein the second identifying information comprises a selfie photograph;
      determine that the second identifying information corresponds to stored second identifying information comprising a stored selfie photograph by comparing, using a convolutional neural network, the selfie photograph to the stored selfie photograph; and
      responsive to the second identifying information corresponding to the stored second identifying information within a second threshold, generate and transmit the one-time use number to the autofill software running on the computing device to automatically provide the one-time use number to the merchant website.

2. The system of claim 1, wherein the first identifying information further comprises a first user device location, a phone number associated with the first user, an email associated with the first user, or combinations thereof.

3. The system of claim 2, wherein determining the score comprises:
   determining whether the phone number associated with the first user matches a stored phone number associated with the first user;
   when the phone number matches the stored phone number, generating a first sub-score that is equal to zero; and
   when the phone number does not match the stored phone number, generating the first sub-score that is greater than zero.

4. The system of claim 3, wherein determining the score further comprises:
   determining whether the email associated with the first user matches a stored email associated with the first user;
   when the email matches the stored email, generating a second sub-score that is equal to zero; and
   when the email does not match the stored email, generating the second sub-score that is greater than zero.

5. The system of claim 4, wherein determining the score further comprises:
   determining whether the first user device location associated with the first user matches or is within a distance from stored first user device locations associated with the first user;
   when the first user device location associated with the first user matches or is within the distance from the stored first user device locations, generating a third sub-score that is equal to zero; and
   when the first user device location associated with the first user does not match or is not within the distance from the stored first user device locations, generating the third sub-score that is greater than zero.

6. The system of claim 5, wherein determining the score further comprises:
   determining the score by combining the first sub-score, the second sub-score, and the third sub-score.

7. The system of claim 1, wherein the one-time use number comprises a number of digits corresponding with a particular card network to allow the one-time use number to be used to make a payment.

8. The system of claim 1, wherein generating the one-time use number comprises generating an expiration date and a card verification value associated with the virtual account number.

9. The system of claim 1, wherein the one-time use number is pseudo-randomly generated.

10. The system of claim 1, wherein the first identifying information is received based on the computing device having navigated to a check out webpage.

11. The system of claim 1, wherein the autofill software comprises a browser plugin.

12. A system comprising:
    one or more processors; and
    a memory in communication with the one or more processors and storing first instructions configured to cause the system to:
    receive a request from an outside system server to transmit a one-time use number associated with a first user to an autofill software running a user device, the request comprising first identifying information associated with the first user and the one-time use number comprising a virtual account number that is linked to the first user's credit card account or debit account, wherein the first identifying information comprises one or more of global positioning system information and an internet protocol address;
    determine a score based on the first identifying information;
    set, using one or more machine learning models, a first threshold based on previous risk assessments for prior transactions;
    determine whether the score is less than the first threshold; and
    when the score is less than the first threshold, generate and transmit the one-time use number to the autofill software running on the user device via the outside system server to automatically provide the one-time use number to a merchant website;

when the score is greater than or equal to the first threshold:
receive second identifying information associated with the first user, wherein the second identifying information comprises a selfie photograph;
determine that the second identifying information corresponds to stored second identifying information comprising a stored selfie photograph by comparing, using a convolutional neural network, the selfie photograph to the stored selfie photograph; and
responsive to the second identifying information corresponding to the stored second identifying information, generate and transmit the one-time use number to the autofill software running on the user device via the outside system server to automatically provide the one-time use number to the merchant website.

13. The system of claim 12, wherein the first identifying information further comprises a phone number associated with the first user or a first user device location.

14. The system of claim 13, wherein determining the score comprises:
determining whether the phone number associated with the first user matches a stored phone number associated with the first user;
when the phone number matches the stored phone number, generating a first sub-score that is equal to zero; and
when the phone number does not match the stored phone number, generating the first sub-score that is greater than zero.

15. The system of claim 14, wherein determining the score further comprises:
determining whether the first user device location associated with the first user matches or is within a distance from stored first user device locations associated with the first user;
when the first user device location associated with the first user matches or is within the distance from the stored first user device locations, generating a second sub-score that is equal to zero; and
when the first user device location associated with the first user does not match or is not within the distance from the stored first user device locations, generating the second sub-score that is greater than zero.

16. The system of claim 15, wherein determining the score further comprises:
determining the score by combining the first sub-score and the second sub-score.

17. A non-transitory, computer-readable medium having first instructions stored thereon that, when executed by one or more processors, cause a computing device to:
receive, via a browser plugin running on a user device, first identifying information associated with a first user, the first identifying information comprising at least one of global positioning system information and an internet protocol address;
determine a score based on the first identifying information;
set, using one or more machine learning models, a first threshold based on previous risk assessments for prior transactions;
determine whether the score is greater than or equal to the first threshold;
when the score is less than the first threshold, generate and transmit a one-time use number to the browser plugin running on the user device to automatically provide the one-time use number to a merchant website, wherein the one-time use number comprises a virtual account number that is linked to the first user's credit card account or debit account;
when the score is greater than or equal to the first threshold:
receive second identifying information associated with the first user, wherein the second identifying information is a selfie photograph;
determine that the second identifying information corresponds to stored second identifying information comprising a stored selfie photograph by comparing, using a convolutional neural network, the selfie photograph to the stored selfie photograph; and
responsive to the second identifying information corresponding to stored second identifying information, generate and transmit the one-time use number to the browser plugin running on the user device to automatically provide the one-time use number to the merchant website.

18. The non-transitory, computer-readable medium of claim 17, wherein the first identifying information further comprises a phone number associated with the first user or a first user device location.

19. The non-transitory, computer-readable medium of claim 18, wherein determining the score comprises:
determining whether the phone number associated with the first user matches a stored phone number associated with the first user;
when the phone number matches the stored phone number, generating a first sub-score that is equal to zero; and
when the phone number does not match the stored phone number, generating the first sub-score that is greater than zero.

20. The non-transitory, computer-readable medium of claim 19, wherein determining the score further comprises:
determining whether the first user device location associated with the first user matches or is within a distance from stored first user device locations associated with the first user;
when the first user device location associated with the first user matches or is within the distance from the stored first user device locations, generating a second sub-score that is equal to zero; and
when the first user device location associated with the first user does not match or is not within the distance from the stored first user device locations, generating the second sub-score that is greater than zero.

* * * * *